United States Patent
Uhl

(10) Patent No.: US 6,941,930 B2
(45) Date of Patent: Sep. 13, 2005

(54) METHOD AND DEVICE FOR CONTROLLING A MULTICYLINDER INTERNAL COMBUSTION ENGINE

(75) Inventor: Stephan Uhl, Friedrichshafen (DE)

(73) Assignee: Robert Bosch GmbH, Stuttgart (DE)

( * ) Notice: Subject to any disclaimer, the term of this patent is extended or adjusted under 35 U.S.C. 154(b) by 18 days.

(21) Appl. No.: 10/204,761

(22) PCT Filed: Jan. 30, 2001

(86) PCT No.: PCT/DE01/00344

§ 371 (c)(1),
(2), (4) Date: Mar. 10, 2003

(87) PCT Pub. No.: WO01/63111

PCT Pub. Date: Aug. 30, 2001

(65) Prior Publication Data

US 2003/0159677 A1 Aug. 28, 2003

(30) Foreign Application Priority Data

Feb. 25, 2000 (DE) ........................ 100 09 065

(51) Int. Cl.$^7$ .............................. F02P 5/00
(52) U.S. Cl. ........................ 123/406.23; 123/406.12; 123/352
(58) Field of Search .................. 123/406.23, 406.12, 123/352, 436, 439; 540/439

(56) References Cited

U.S. PATENT DOCUMENTS

| 4,357,662 | A | * | 11/1982 | Schira et al. | 701/111 |
| 4,418,669 | A | * | 12/1983 | Johnson et al. | 123/436 |
| 4,475,511 | A | * | 10/1984 | Johnson et al. | 123/436 |
| 4,476,833 | A | * | 10/1984 | Johnson et al. | 123/436 |
| 6,021,758 | A | * | 2/2000 | Carey et al. | 123/436 |

FOREIGN PATENT DOCUMENTS

| DE | 198 28 279 | 12/1999 |
| EP | 01 40065 | 5/1985 |
| EP | 07 81912 | 7/1997 |
| JP | 61 025 947 | 2/1986 |

* cited by examiner

Primary Examiner—Bibhu Mohanty
(74) Attorney, Agent, or Firm—Kenyon & Kenyon

(57) ABSTRACT

In a method for controlling a multicylinder internal combustion engine, where a cylinder-equalization control is performed to adjust cylinder-specific torque contributions to the overall torque of the internal combustion engine, a functioning monitoring is performed for the cylinder-equalization control, and, in response to disturbances in the area of the cylinder-equalization control, at least one error signal may be generated to indicate the existence of a disturbance.

11 Claims, 1 Drawing Sheet

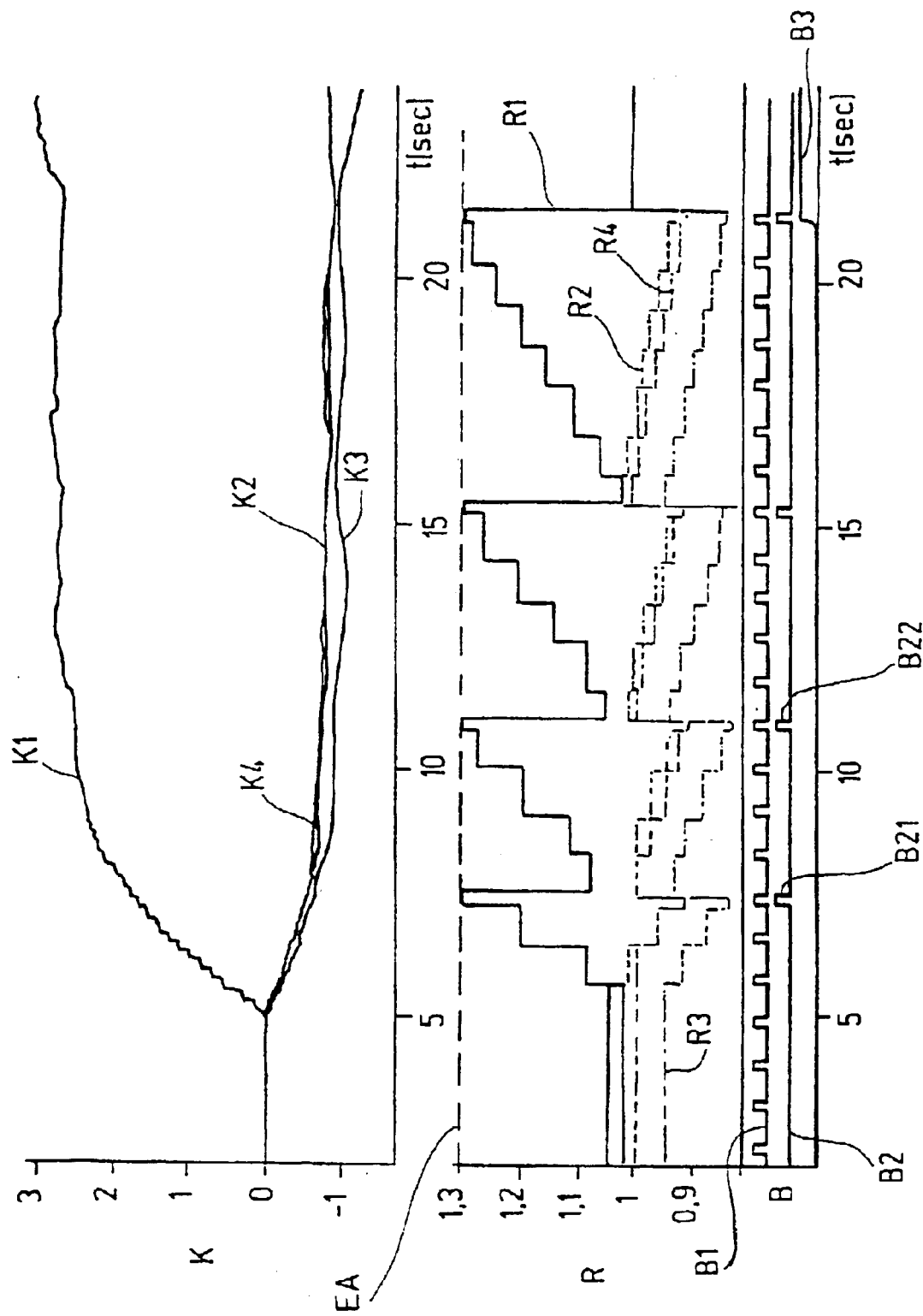

METHOD AND DEVICE FOR CONTROLLING A MULTICYLINDER INTERNAL COMBUSTION ENGINE

FIELD OF THE INVENTION

The present invention is directed to a method and a device for controlling a multicylinder internal combustion engine.

BACKGROUND INFORMATION

In conventional control devices for controlling multicylinder internal combustion engines, a cylinder equalization control is provided for adjusting and/or equalizing cylinder-specific torque contributions to the overall torque of the internal combustion engine. The internal combustion may be a gasoline or diesel engine, for example. There is a special need for a cylinder-equalization function in direct-injection gasoline engines. In such engines, increased irregular operation can occur due to a low compatibility to tolerances of the combustion process in stratified operation and/or due to the tolerances of the high-pressure injectors used or in the distribution of the fuel to the individual cylinders. Age-related changes in the flow characteristic of the high-pressure injectors can also play a role. A cylinder equalization control can effect an improvement in running smoothness.

Within the framework of cylinder equalization, the active torque contribution (actual torque) of a particular cylinder is detected in relation to its preceding ignition, i.e., not as an absolute torque determination, based on an analysis of the time characteristic of the crankshaft or camshaft rotation. A torque correction can be effected, with the goal of equalizing cylinder-specific torque contributions, by intervening in at least one combustion-determining parameter, such as the injected fuel quantity, the ignition point timing in the case of a gasoline engine, in the exhaust-gas recirculation rate, or in the injection position. The term "injection position" refers here to the angular position of an injection pulse with respect to a reference point, for example to the top dead center of the piston of a cylinder in its power stroke.

In practice, cylinder-equalization controls, in which so-called segment periods are recorded to analyze the time characteristic of the moment of rotation of the crankshaft or camshaft, have proven to be particularly useful. Segment periods are the times it takes for the crankshaft or camshaft to cover a predefined angular range assigned to a particular cylinder. The more smoothly the engine is running, the more negligible the differences are between the segment periods of the individual cylinders. A measure of the engine's irregular operation can be derived from the mentioned segment periods. Conventional methods provide for an individual control to be assigned to each cylinder of the internal combustion engine and for the individual control to receive a cylinder-specific, irregular-operation actual value as an input signal. On the basis of the irregular-operation actual values, a control setpoint value is determined. For example, the irregular-operation values of a plurality of cylinders can be averaged to produce a control setpoint value. On the output side, the controls influence the cylinder-specific injection times and the cylinder-specific torque contributions such that the cylinder-specific actual values approach the setpoint value. Cylinder-equalization controls are described, for example, in European Patent No. 140 065 and in German Patent Application No. 198 28 279, the latter being incorporated for reference herein.

SUMMARY

The present invention provides improvements in the area of cylinder-equalization control.

In accordance with an embodiment of the present invention, improvements are achieved in the area of cylinder-equalization control by monitoring the functioning of the cylinder-equalization control, and in response to disturbances in the area of the cylinder-equalization control, generating at least one error signal indicating the existence of a disturbance. This makes it possible to recognize whether a cylinder-equalization control is performing its designated function in the manner intended.

With respect to direct-injection gasoline engines, for example, conventional cylinder-equalization controls do not ensure that a controller intervention measure, such as enriching the combustion mixture via excessively proportioned fuel metering, actually achieves the desired effect, i.e., leads to the desired increase in the torque contribution. In contrast, according to the present invention, the effectiveness of the measures taken may be recognized by functioning monitoring, and appropriate remedial measures may be introduced in response to the at least one error signal. The functioning monitoring may be quasi wrapped around the cylinder-equalization control to monitor it for proper functioning. In this manner, controller stability and controller action may be ensured in the context of the cylinder equalization.

One advantageous embodiment of the present invention provides for at least one combustion-related performance quantity to be controlled on an individual basis, within a defined operating range, for each cylinder of the internal combustion engine. This quantity may be the fuel metering, i.e., the quantity of the fuel to be injected, which, particularly in the stratified operation of gasoline engines, virtually exclusively determines the cylinder-specific torque. An error signal may be generated when at least one cylinder-specific control reaches a boundary or a limit of the defined operating range. Thus, when the control goes beyond the operating range, this is used as an indication of a possibly existing problem. It is noted that the typical task of a cylinder-equalization control is to correct the unavoidable torque differences that occur between the individual cylinders in normal operation of the internal combustion engine. As mentioned, these torque differences may be caused, for example, by differences in the flow characteristics of the individual high-pressure injectors that are due to tolerances. At present, it is not unusual to have typical tolerances in the range of 20 to 25% around an average injection value. The torque errors to be expected because of scattering high-pressure injectors may be of equal magnitude. In an internal combustion engine, this is taken into consideration by properly rating the operating range of the control. For example, an intervention stop, which is applied to twice the level as the expected maximum torque error, may be set for each controller. This provides the control with a certain safety reserve or ruggedness, and a normal controller operation is ensured. Thus, the operating range of the control is dimensioned to be ample enough to ensure that customary tolerances lie within the operating range and that a certain safety distance from the limits of the operating range remains. If, at this point, in at least one control, an operating range limit is reached (i.e., a controller runs to its preset intervention stop), then the goal of cylinder-equalization control, namely the elimination of angular-acceleration contributions of the individual cylinders, is no longer attainable using the available, limited intervention of the control. This leads to the generation of an error signal.

One embodiment of the present invention provides that, in response to an error signal, a defined change in the control characteristic of the control occurs. For instance, the closed-loop gain may be canceled in a suitably predefined manner. Redefining the controller performance in accordance with this embodiment, may be performed automatically during operation of the internal combustion engine by changing the controller parameterization. This advantageously takes into account the fact that the causes of a controller stop may lie in different areas. Errors can occur in the area of the control itself (denoted here as controller defect) and also in the area of the function to be controlled (denoted here as cylinder defect). These types of errors can occur alternatively or cumulatively.

For example, instability of the control due to unpredictable parameter changes within the control system can occur that cause the control stop to be reached. For example, changes may have occurred in the frictional torque of the engine. If, for example, an aging-related system parameter change is the cause of the effected controller stop in the area of the control, then this may be accounted for by redefining the controller performance, such as by modifying the controller loop gain, thereby enhancing the ruggedness of the control. Once this adjustment is made, fluctuations may be within the control's operating range, including the redefined controller loop gain, and the control will again function without faults.

According to another embodiment of the present invention, the adaptation of the controller characteristic, such as via canceling the controller loop gain, is carried out at least one additional time when a controller stop occurs again following a first-time change, and an error signal is thereby generated. Thus, subsequent to a first change in the controller characteristic, as a response to a new error signal, the controller characteristic is changed at least one additional time, in particular through a subsequent cancellation of the controller gain. The gain can be reduced, for example, in a first step to half, in a next step then to a third, subsequently to a fourth, etc., of the controller loop gain originally set. By successively reducing the controller loop gain to a predefinable final value, the control, which usually works with individual PI controllers, becomes more rugged, but also dynamically slower, which is taken into consideration.

Actual cylinder defects may also be the cause of a controller stop. These defects may be mechanical defects associated with the injection and/or the ignition of a cylinder. In some cases, the torque expected from a cylinder cannot be achieved by a (limited) enriching, i.e., a heavier fuel metering, because the mixture cannot be sufficiently introduced into the cylinder or properly ignited due to more pronounced changes in the valve flow rate and/or in the valve jet. For cases of this kind, the present invention provides that, as a response to an error signal which may follow an at least one-time change in the controller characteristic, the control is switched off by the functioning monitoring and the control characteristics may be expediently reset to the originally defined operating range. In this manner, the control is deactivated by the functioning monitoring and restored to its original state. Once the underlying defect is remedied, the control function is then able to immediately intervene with its original effectiveness.

To permit appropriate remedies promptly in response to the occurrence of defects, the present invention provides for an external warning signal to be output as a response to an error signal. This warning signal may follow an at least one-time change in the controller characteristic. This may activate, for example, an optical warning display that the operator is able to directly perceive, and/or may generate an entry to this effect in a memory of a diagnostic system, so that during a subsequent diagnosis, the defect that has occurred may be eliminated.

As a response to an error signal that may follow an at least one-time change in the control characteristic, the control is stopped by the functioning monitoring, the active controller characteristics being retained. An appropriate external warning signal may be output indicating the existence of a defect and a request may be made to remedy the defect.

According to a further embodiment, the present invention provides for a multi-step, or staggered, method of reacting to problems that arise in the cylinder-equalization control. First, the control characteristics are modified by suitable new controller dating that can be performed automatically and during operation of the internal combustion engine such that ageing-related changes in the control system are taken into account. This modification may occur several times. After this adaptation of the controller characteristics, when errors are still being indicated by the functioning monitoring, it is determined that there are actual defects in the cylinder area possibly requiring a repair intervention. The first step may be executed, unnoticed by the operator, while the second step expediently generates warning signals, indicating a need for maintenance or repair.

BRIEF DESCRIPTION OF THE DRAWING

FIG. 1 shows an experimentally determined measuring diagram for elucidating the performance of the functioning monitoring of a cylinder-equalization control.

DETAILED DESCRIPTION

In FIG. 1, three diagrams are plotted over a common time axis (X-axis) to depict the time characteristic of an embodiment of a functioning monitoring for a cylinder-equalization control in the context of gasoline direct-injection engine equipped with four cylinders. The assigned values of the Y-axes were determined experimentally, where the operation of the internal combustion engine was conducted at approximately 1,400 rpm in stratified operation (15%)

The four curves K1, K2, K3, K4 in the top diagram indicate cylinder-specific angular-acceleration values K of the crankshaft of the internal combustion engine as Y-values. The setpoint value (control setpoint of the cylinder-equalization control) corresponding to a highest running smoothness lies, in the context of the selected definition, at value K1=K2 K3=K4=0. These ideal values are approximately set in the first five seconds of the plotting time period by the cylinder-equalization control. A value deviating from zero for at least one of the angular-acceleration values K through K4 signifies that a control intervention in the cylinder-equalization control may be required.

In the middle diagram, control intervention factors R for the four PI controllers of the cylinder-equalization control assigned to the four cylinders, are plotted on the Y-axis. The ordinate values R representing a controller intervention are to be understood as factors plotted against the injection time at the particular cylinder. Thus, for example, a value of R1=1.2 signifies that, at cylinder 1, the injection time is increased by the control by 20% over a reference injection time, which ideally corresponds to a 20% increase in the injected fuel quantity. Consequently, values of R>1 correspond to an enriching of the mixture beyond the average mixture composition, while values of R<1 signify a leaning of mixture. The overall control may be set such that the total injection quantity substantially remains the same per unit of time.

As mentioned above, it is not unusual to have tolerances in the range of 20 to 25% around an average injection value.

This variance may be caused by differences in the flow characteristics of the individual high-pressure injectors that are due to tolerances. To ensure that the functioning monitoring does not interpret fluctuations in this range as an indication of the existence of a defect going beyond this in the cylinder area and/or in the control, the operating range of the controls may be adjusted by appropriate controller dating, such that the controls reach their controller stop at 30% deviation from intervention factor 1(R) value=1.3, for example. Between the expected maximum tolerance of, for example, 25% and this intervention stop EA, a certain safety reserve still exists, which ensures a normal controller operation in spite of possibly existing tolerance-related deviations among the individual injections.

The three rectangular-curve type lines in the bottom diagram represent control bits B of the digital engine control, which also includes the controllers. In this context, top curve B1 represents the controller timing, and the regularly occurring rectangular pulses of about 200 millisecond length represent the corresponding controller clock-pulse bits, which prompt a clocked updating of the controllers. Middle curve B2 represents the error indication of the functioning monitoring. A corresponding error bit, as occurs, for example, at instant t=7.2 seconds, corresponds to an error signal of the functioning monitoring and occurs under certain conditions which are already explained in further detail below.

Bottom line B3, coinciding predominately with the abscissa, represents a switch-off function for the control via the functioning monitoring and is defined such that, when a bit is not set, the control (line on abscissa) is switched on, and, when a bit is set, the control is switched off. Accordingly, in the example depicted, following approximately 21.2 seconds, the control is switched off.

In the following, the performance characteristics of the functioning monitoring are elucidated on the basis of these diagrams. In the top diagram, representing the actual state of the engine with respect to its running smoothness, the running smoothness up to instant t=5 seconds is optimal, since all cylinder-specific angular acceleration values are close to control setpoint value K=0. At instant t=5 seconds, a disturbance occurs in that less fuel is dispensed at the injector of the first cylinder 50%. As a result, the torque contribution of this cylinder or its angular acceleration value (curve K1) diverges from the setpoint value and rises approximately within the next 5 seconds to a value of about 2.5. At the same time, the angular acceleration values of the remaining three cylinders (curves K2, K3, K4) gradually deviate by substantially the same amounts from the control setpoint value. The amount of the deviation is determined, such that the total fuel consumption of all cylinders essentially remains the same.

In the middle diagram, the reaction of the cylinder-specific controllers to the defect at the injector of the first cylinder is discernible. On the basis of curve R1, it becomes clear that the PI controller assigned to the first cylinder is attempting to compensate for the errors recognized by the control (50% less fuel at injector 1) by increasing the injection time. This is increased step-by-step in time with the controller (curve B1), in each instance in steps of 10% relative to the output value. At instant t=7.2 seconds, the increase in injection time amounts to 30%, which corresponds to the controller's preset intervention stop. Consequently, the limit of the controller's operating range is reached. On the basis of the controller setpoint input for a constant total injection quantity, the injection times or injection quantities of the other three cylinders (R2, R3, R4) are lowered in corresponding fashion step-by-step.

In response to intervention stop EA being reached at t=7.2, an error signal is output to the control where a first error bit B21 is set.

On the basis of curves K1 through K4 deviating substantially from K=0, it is discernible that, at the instant the intervention stop is reached, the running smoothness of the engine is not restored. Thus, the controller target point is not reached.

When the operating range limit of the control (intervention stop EA) is reached, this leads to changes in the controller characteristic of the PI controller assigned to the first cylinder. The controller is set back or reset to set the I component of the controller to zero again so that preceding control deviations no longer influence the controller characteristics after it is reset. The controller loop gain is then reduced, in the illustrated example, to half of the original controller loop gain existing at instant t=0. This provides an increase in the controller ruggedness, with a simultaneous loss in the controller's dynamic response. In other words, the controller reacts more slowly to control deviations.

Since, despite the controller intervention between the occurrence of the disturbance (t=5 seconds) and the attainment of the intervention stop (t=7.2 seconds), there is no improvement in the running smoothness (curve K1 deviates with an increasing tendency from curves K2 through K4), the control again attempts in the time period following the first-time attainment of the intervention stop at T=7.2 seconds, to compensate for the signaled error (less fuel at the first injector) in step with the controller by increasing the assigned injection time. After four increasing steps or a time interval of approximately 3.5 seconds, the controller again reaches its preset intervention stop at t=11 seconds, without the running smoothness disturbance being canceled. As a result, a second error signal (error bit B22) is generated in the manner described, the control is again reset, and the controller loop gain is further reduced. This is reduced, for example, to one third of the original controller loop gain and, in this manner, the controller ruggedness is further enhanced.

This process (resetting of the controller when the intervention stop is reached and a further reduction in the controller loop gain) is performed two more times in the illustrated example, in each case after the intervention stop is reached in the subsequent controller period, the time period until the new intervention stop is reached increases, and correspondingly more steps for increasing the injection time are carried out.

After the controller loop gain is canceled three times, the controller again reaches its intervention stop (t=21.2 seconds). In the illustrated specific embodiment, this is evaluated as an indication that the intervention stop is not caused by instabilities in the control (for example, due to parameter changes in the controlled system), but rather, to a cylinder defect, which, in the exemplary case, results in a considerable reduction in the injected fuel quantity at the first cylinder. The control is designed such that, following the fourth time the intervention stop is reached (t=21.2 seconds), the functioning of the control function is switched off by the functioning monitoring (setting of the function switch-off bits in curve B3). In this context, the intervention factors of all controllers are set back to value 1.

The last error bit or error signal that leads to the functioning monitoring being switched off and/or the switch-off signal at t=21.2 seconds in curve B3 may be used for activating an external warning indication, such as a warning lamp, and/or for producing an entry in a diagnostic memory, in order to show at a next engine diagnosis that a cylinder defect exists which cannot be compensated by the cylinder equalization control. The error information may be specific enough to allow identification of where the error occurred, in this case cylinder 1. Thus, targeted remedial measures, such as exchanging the injector of this cylinder, may be undertaken.

What is claimed is:

1. A method for controlling a multicylinder internal combustion engine including a cylinder equalization control for adjusting cylinder-specific torque contributions to an overall torque of the internal combustion engine, the method comprising:

monitoring functioning of the cylinder-equalization control;

in response to a monitored disturbance in functioning of the cylinder-equalization control, generating at least one error signal indicating existence of the disturbance; and in response to the at least one error signal, changing a control characteristic of the cylinder-equalization control.

2. The method of claim 1, further comprising:

canceling a closed-loop gain of the control characteristic.

3. The method of claim 1, further comprising:

controlling at least one combustion-related parameter of each cylinder of the internal combustion engine within a defined operating range; and generating an error signal when the at least one combustion-related parameter of any cylinder reaches a limit of the defined operating range.

4. The method of claim 2, further comprising:

changing the control characteristic at least one additional time in response to a new error signal, subsequent to a first change in the control characteristic.

5. The method of claim 4, wherein the change of the control characteristic includes cancellation of the control loop gain.

6. The method of claim 1, wherein as a response to the at least one error signal, one of a) and b) are performed:

a) the cylinder-equalization control is switched off, and the control characteristic is reset, and b) as a response to the at least one error signal, the control is stopped, and the control characteristic is retained.

7. The method of claim 6, wherein the control characeristic is reset to originally defined operating characteristics.

8. The method of claim 6, wherein the control is stopped in response to the at least one error signal following an at least one-time change in the control characteristic.

9. The method of claim 1, further comprising:

in response to the at least one error signal, emitting an external warning signal.

10. The method of claim 9, wherein the warning signal includes at least one of an optical warning display that is directly perceivable by an operator and an entry input into a memory of a diagnostic system capable of being externally queried.

11. The method of claim 9, wherein the warning signal is emitted following an at least one-time change in the control characteristic.

* * * * *

UNITED STATES PATENT AND TRADEMARK OFFICE
CERTIFICATE OF CORRECTION

PATENT NO. : 6,941,930 B2
APPLICATION NO. : 10/204761
DATED : September 13, 2005
INVENTOR(S) : Stephan Uhl It is certified that error appears in the above-identified patent and that said Letters Patent is hereby corrected as shown below:

Column 4, line 45, change "K1=K2 K3=K4=0" to --K1=K2=K3=K4=0--

Signed and Sealed this

Thirtieth Day of January, 2007

JON W. DUDAS
*Director of the United States Patent and Trademark Office*